United States Patent [19]

Croswhite

[11] 4,226,123

[45] Oct. 7, 1980

[54] NON-SYNCHRONOUS FOUR SPEED AUTOMATIC TRANSMISSION WITH OVERDRIVE

[75] Inventor: Howard L. Croswhite, Livonia, Mich.

[73] Assignee: Ford Motor Company, Dearborn, Mich.

[21] Appl. No.: 966,975

[22] Filed: Dec. 6, 1978

[51] Int. Cl.² .............................................. F16H 57/10
[52] U.S. Cl. ........................................ 74/688; 74/763
[58] Field of Search ............................ 74/688, 789, 763

[56] References Cited

U.S. PATENT DOCUMENTS 4,014,223  3/1977  Pierce ..................................... 74/688

Primary Examiner—C. J. Husar
Assistant Examiner—Frank McKenzie
Attorney, Agent, or Firm—Donald J. Harrington; Keith L. Zerschling

[57] ABSTRACT

A multiple ratio power transmission mechanism having a hydrokinetic converter and compound planetary gearing wherein provision is made for effecting low speed ratio operation and second speed ratio operation in which the converter is fully active, direct drive or high speed ratio operation that is characterized by a split torque delivery path with a portion of the torque being delivered hydrokinetically and the balance of the torque being delivered mechanically, and an overdrive ratio wherein the mechanism is conditioned for overdrive operation with a fully mechanical torque delivery.

4 Claims, 5 Drawing Figures

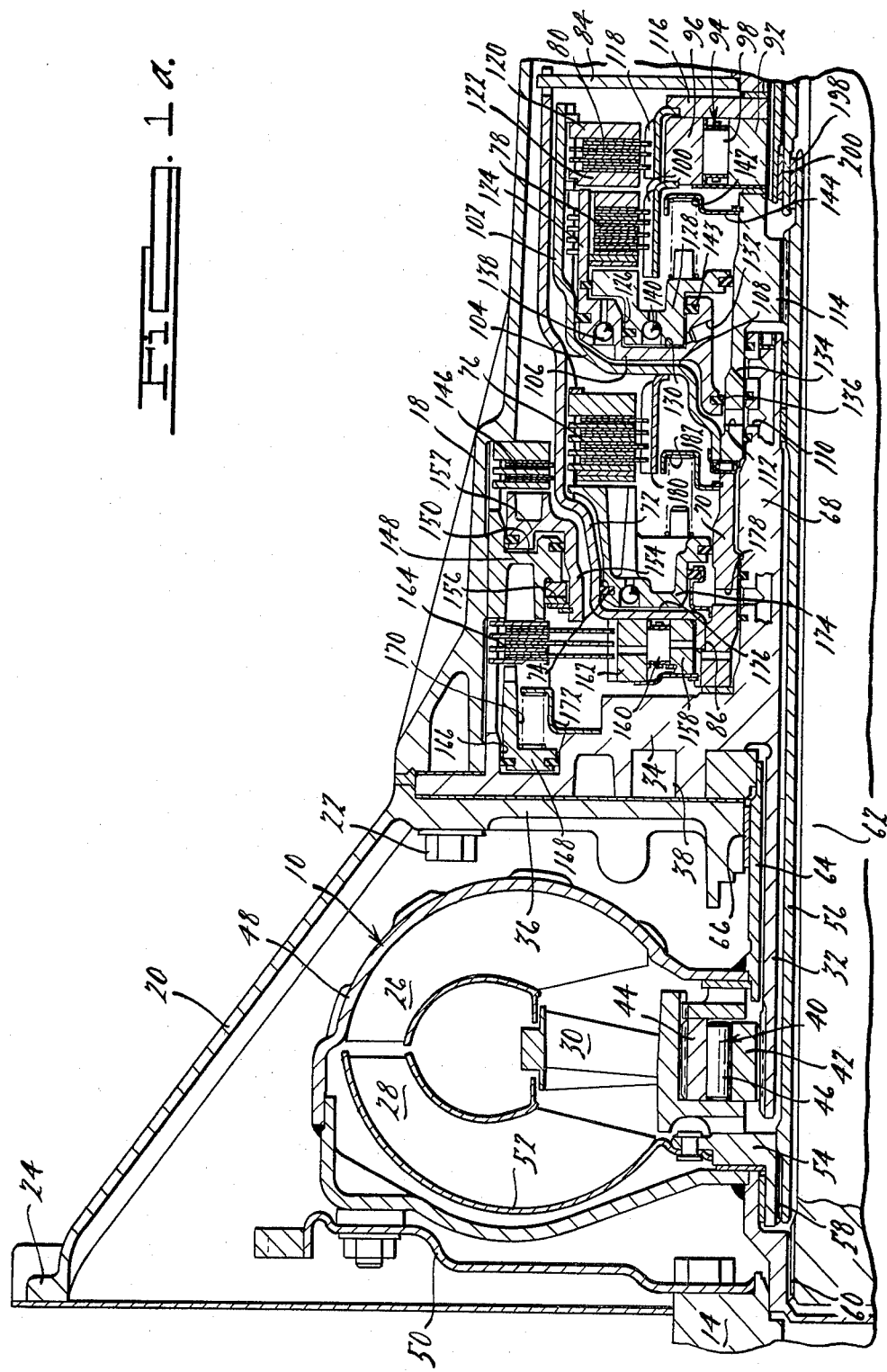

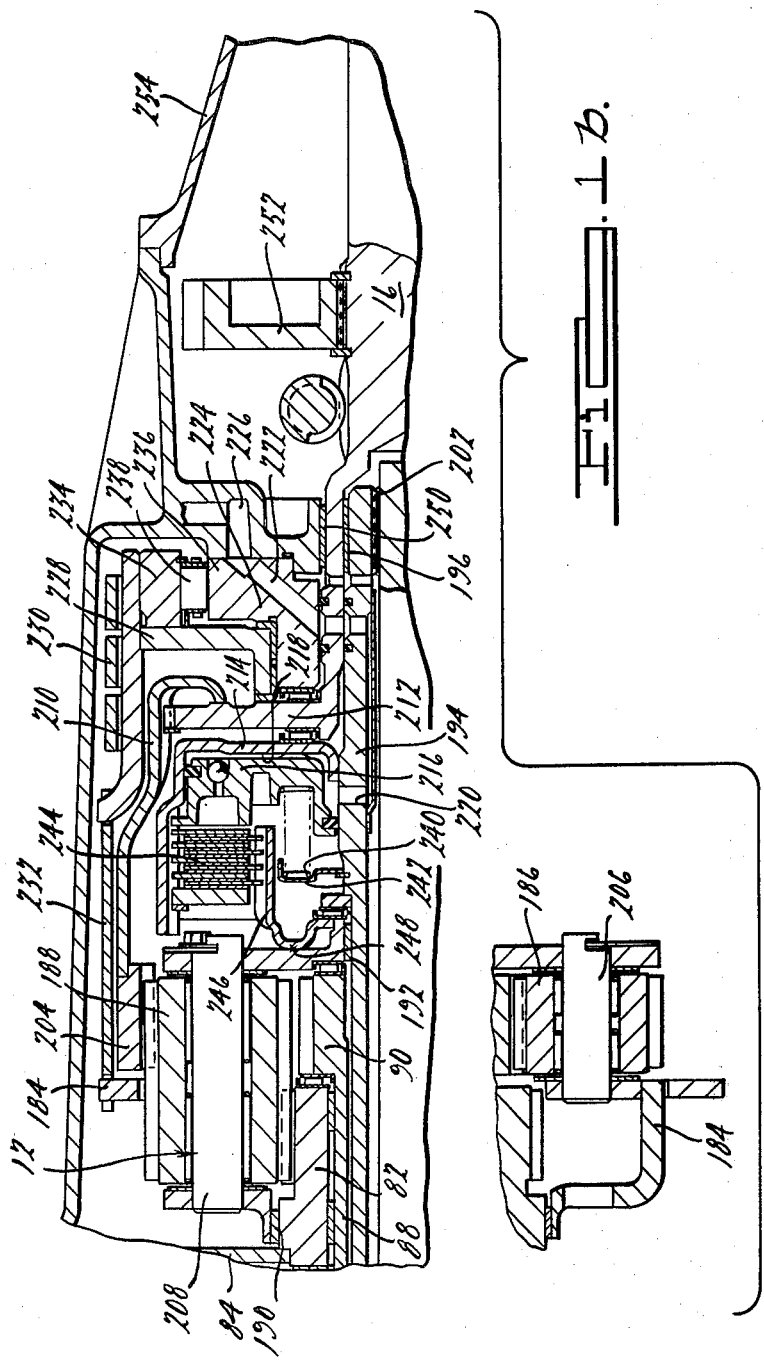

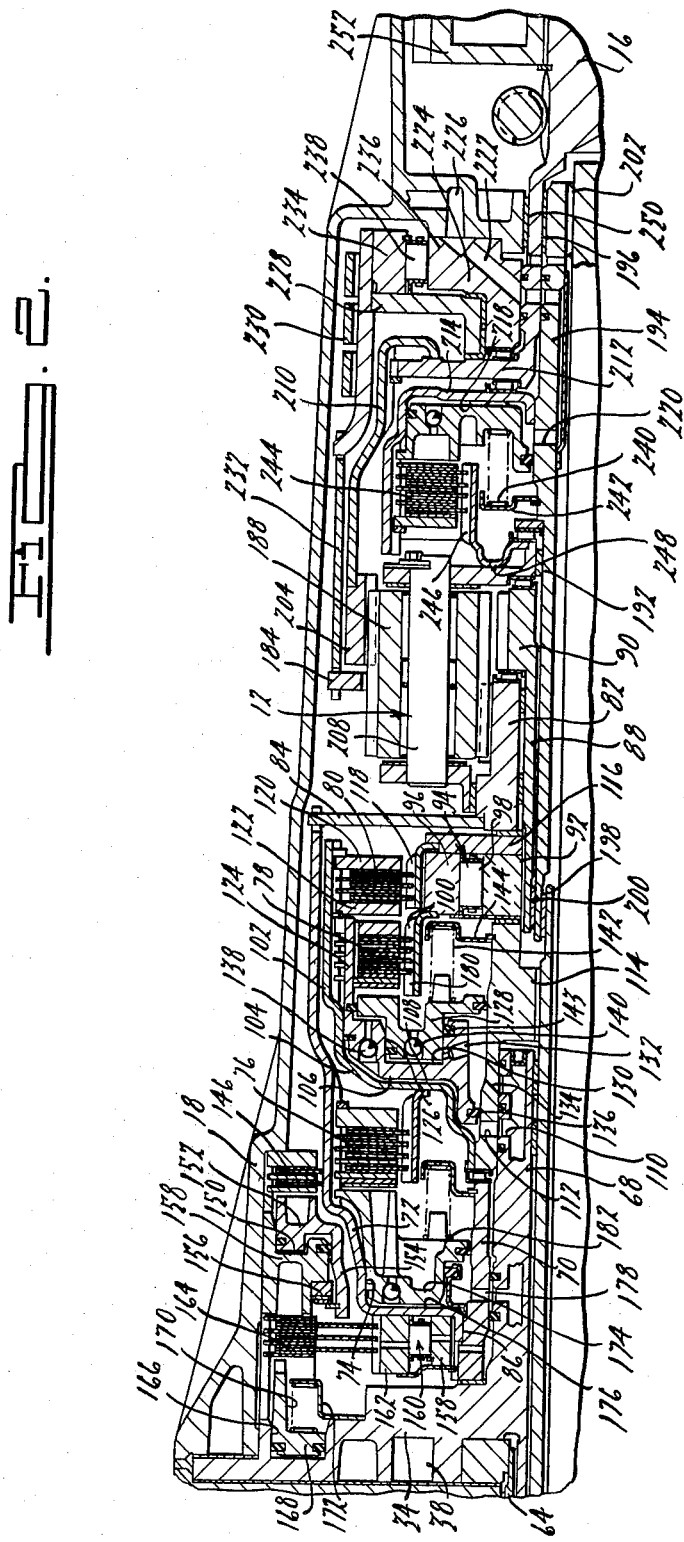

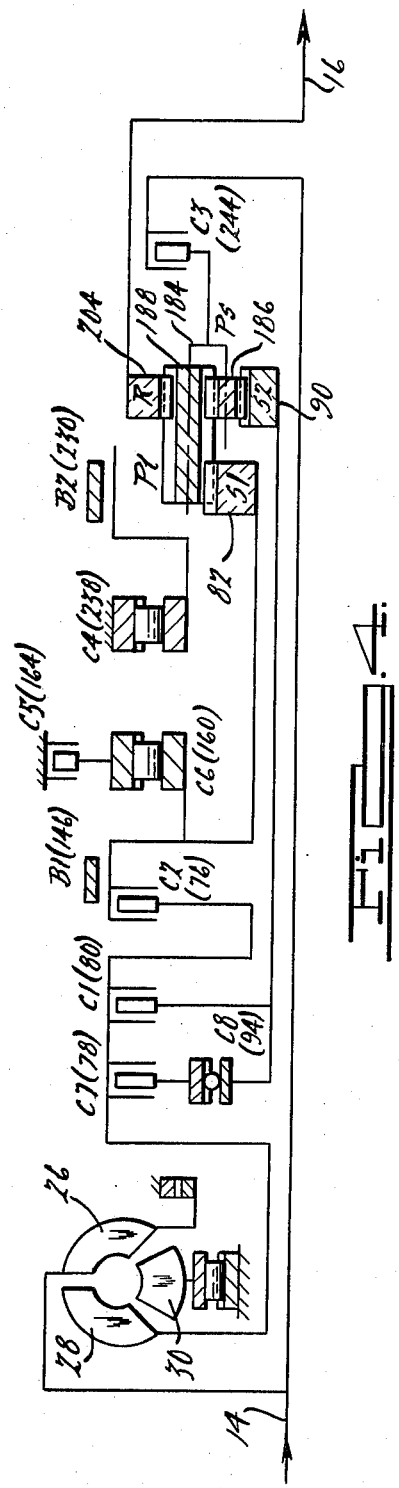

NON-SYNCHRONOUS FOUR SPEED AUTOMATIC TRANSMISSION WITH OVERDRIVE

BRIEF DESCRIPTION OF THE INVENTION

My invention is a four speed ratio automatic transmission with two hydrokinetic underdrive ratios, a split-torque direct drive and a fully mechanical overdrive. The transmission is characterized also by non-synchronous shifts from the first ratio to the second ratio, from the second ratio to the third ratio and from the third ratio to the fourth ratio. These non-synchronous shifts are achieved without sacrificing the ability of the transmission to accommodate torque reversals in the driveline which is necessary to effect engine braking of the vehicle. Friction clutch-and-brake structure is used to achieve ratio changes. The clutch for achieving third speed ratio comprises a compound piston and cylinder arrangement which define plural pressure chambers in a compact fashion without an increase in size in comparison to conventional clutch servos for corresponding transmissions of the non-synchronous type.

My invention comprises improvements in gear systems of the type shown in Egbert U.S. Pat. No. 3,314,307 and in Konrad U.S, Pat. No. 3,162,063. Each of the reference patents shows a transmission with a fourth-ratio overdrive, a split-torque direct drive and two underdrive ratios. Each transmission of the reference disclosures requires the use of synchronized clutches and brakes to effect the ratio changes.

BRIEF DESCRIPTION OF THE FIGURES OF THE DRAWINGS

FIG. 1A shows a portion of a transmission mechanism embodying the improvements of my invention. It includes an illustration of a converter and the forward clutch and brake structure.

FIG. 1B is a cross-sectional view of the gearing portion of a transmission mechanism embodying the improvements of my invention.

FIG. 2 is a combination cross-sectional view of the structures of FIGS. 1A and 1B.

FIG. 3 is a chart showing the clutch and brake engagement and release pattern for the transmission of FIGS. 1A and 1B.

FIG. 4 is a schematic representation of the transmission of FIGS. 1A and 1B.

PARTICULAR DESCRIPTION OF THE INVENTION

A hydrokinetic torque converter is shown at 10, and a compound planetary gear system is shown at 12. The The converter and the gear system establish plural torque delivery paths between engine crankshaft 14, which serves as a power input member, and a driven shaft 16 to which a driveshaft is connected, the drive shaft in turn distributing torque through a differential mechanism to driving axles.

The transmission mechanism includes a main transmission housing 18 and a converter housing 20. The housings 18 and 20 are joined together by bolts 22. The left-hand margin 24 of the housing 20 can be bolted to the engine block of the internal combustion vehicle engine.

The housing 18 is tapered from the left side to the right side to permit it to be formed by a die casting operation. This construction readily adapts the transmission housing for manufacture with cast aluminum alloys, thus reducing the weight of the transmission assembly.

The converter 10 includes a bladed impeller 26, a bladed turbine 28 and a bladed stator 30 arranged in toroidal fluid-flow relationship. The stator is supported on a stationary sleeve shaft 32 which forms a part of a bearing support wall 34 secured to forward wall 36 of the housing 20. Bearing support wall 34 also defines a housing for a positive displacement transmission pump 38.

An overrunning brake 40 is situated between stator sleeve shaft 32 and the stator 30. It includes an inner race 42 splined to the sleeve shaft 32 and an outer race 44 connected to the hub of the stator 30. Overrunning clutch rollers 46 are located between the races 42 and 44, the latter being cammed to permit camming action with the rollers, thus accommodating freewheeling motion of the stator in the direction of rotation of the impeller during coupling operation but preventing its rotation in the opposite direction during operation in the torque multiplication mode of the converter.

The impeller includes an impeller shell 48 which is secured to an engine flywheel 50 connected to the engine crankshaft 14. Turbine 28 is located within the impeller shell 48; and it includes an outer shroud 52 which is connected to a turbine hub 54, the latter being splined to turbine sleeve shaft 56 as shown at 58. The hub of the impeller shell 48 is splined at 60 to an engine driven shaft 62 which extends through the center of the transmission mechanism and which is surrounded by sleeve shaft 56 and stationary sleeve shaft 32. Impeller support sleeve shaft 64 is journalled at 66 on the wall 36.

A clutch support sleeve 68 formed on wall 34 journals clutch hub 70. It carries a torque transfer member 72 which defines an annular cylinder 74. Transfer member 72 surrounds third speed ratio clutch assembly 76, forward drive clutch 78 and hill brake clutch assembly 80. The right-hand end of the transfer member 72 is connected drivably to sun gear 82. Servo drive plate 84 at the left-hand end is drivably connected to the sleeve 70 as shown at 86.

Sun gear 82 is journalled on sun gear sleeve shaft 88, which forms a part of sun gear 90. The pitch diameter of sun gear 90 is smaller than the pitch diameter of sun gear 82. The left-hand end of the sun gear sleeve shaft 88 is splined to inner race 92 of overrunning coupling 94. Outer race 96 of the overrunning coupling 94 is cammed to permit camming action with coupling rollers 98, thus permitting a one-way driving connection between the races. The outer race 96 is connected to externally splined clutch element 100 which carries clutch discs of the multiple disc clutch assembly 78. Externally splined clutch discs are carried by internally splined clutch element 102 which are defined by annular clutch cylinder 104. An annular piston 106 is situated in the clutch cylinder 104 and cooperates with it to define a pressure cavity 108, which is in fluid communication with internal passage structure 110 in the clutch support sleeve shaft 68 through port 112 formed in clutch hub 114, the latter being splined to the turbine sleeve shaft 56.

Cylinder sleeve shaft 88 is connected drivably to clutch element 116 which in turn is connected drivably to externally splined clutch element 118, the latter carrying internally splined clutch discs of the clutch assembly 80. Externally splined clutch discs of the clutch assembly 80 are splined directly to the clutch element 102. Clutch disc backup ring 120 is also carried by the clutch element 102 as is clutch disc actuator ring 122. Clutch actuator rods 124 extend through cooperating openings in the clutch discs of the clutch assembly 78 and are adapted to transfer a clutch actuating force on the piston 106 to the actuator ring 122 to apply the clutch assembly 80 and thus establish a direct-driving connection between sun gear 90 and the turbine shaft 56 as clutch 80 bypasses overrunning coupling 94 and permits power transfer to the turbine shaft to establish braking during first speed ratio operation, second speed ratio operation and third speed ratio operation.

Piston 106 is part of a compound piston assembly which includes an annular cylinder 126 within which is positioned an annular piston 128. The piston 128 and the cylinder 126 in piston 106 define a secondary pressure chamber 130 which is applied as fluid pressure is admitted through port 132. Port 132 communicates in turn with port 134 in the support sleeve 114. Pressure admitted to chamber 108 through passage 112 acts upon the pressure area of piston 106. A lip seal 136 is carried by the piston 106 and permits pressure to be transferred from the chamber 108 to the lower region of the pressure chamber 130 as chamber 108 is pressurized. It prevents transfer of pressure in the opposite direction from the lower region of chamber 130 to the chamber 108 when chamber 130 is pressurized.

Pistons 106 and 128 include centrifugal pressure relief valves in the form of ball valve elements 138 and 140, respectively, which are seated on conical valve seats. When pressure is exhausted from their respective pressure chambers, the valve elements 138 and 140 will be moved outwardly under centrifugal force and the residual centrifugal preserve in the chamber will be exhausted to the exhaust region behind the pistons. A piston return spring 142 acts on the piston 128 and is seated on spring seat 144 carried by the clutch support sleeve 114.

When pressure is admitted to pressure chamber 130, the clutch 78 is applied as pressure is distributed over the entire surface of the piston 128. Lip seal 143 permits transfer of pressure from the upper region of chamber 130 to the lower region thereof. Clutch 78 is applied during operation at each of the four forward driving ratios as well as during coast braking in the first, second and third ratios. Torque is not delivered through the clutch 78 during hill braking, but it need not be released as hill braking torque is transferred through clutch 80 during operation in the first, second and third ratios.

Clutch 76 is applied during reverse drive. It distributes turbine torque from turbine sleeve shaft 156 to the torque transfer member 72, which drives the sun gear 82.

The torque transfer member 72 carries internally splined brake discs for multiple disc brake assembly 146. Externally splined brake discs of assembly 146 are splined to the housing 18. Secured also to the housing 18 is annular cylinder housing 148 which defines an annular cylinder 150 in which is received annular piston 152. Piston 152 acts against the brake discs or brake plates of the brake assembly 146, and it includes an extension 154 located adjacent the housing 148. Piston return spring 156 is situated between the housing 148 and the extension 154 to move normally the piston 152 to a brake release position. Fluid pressure is applied to the cylinder 150 to engage the brake disc assembly 146 whenever the transmission is operated in the second hill braking condition or the fourth speed ratio condition. This anchors the sun gear 82 to provide a reaction point.

Sleeve 70 and torque transfer member 72 are splined directly to inner race 158 of an overrrunning coupling 160. The coupling 160 includes also outer race 162 to which are connected internally splined brake discs for brake assembly 164. Externally splined brake discs or plates of the assembly 164 are splined to the housing 18. Overrunning clutch rollers are situated between the races 158 and 160, the latter being cammed to permit one way braking action between the races.

Plate 34 is provided with an annular cylinder 166 in which is positioned annular cylinder 168. Piston return springs 170 anchored on spring backup member 172 on the plate 34 normally urge the piston 168 to a brake release position. When fluid pressure is admitted to the cylinder 166 brake assembly 164 is applied. The brake assembly 164 is applied whenever the transmission is conditioned for second, third or fourth speed ratio operation or the second or third speed ratio hill braking condition. The reaction force for the braking force applied to the brake assembly 164 is absorbed by cylinder member 148 secured to the housing 18.

The annular cylinder 74 receives an annular piston 174. The piston 174 and the cylinder 74 define a pressure cavity 176 which can be pressurized with pressure distributed to it through port 178. The piston 174 is adapted to act against the discs of the multiple disc clutch assembly 76 which comprise externally splined clutch discs carried by the torque transfer member 72 and internally splined discs carried by clutch member 180 drivably connected to the clutch cylinder 104 and the clutch support sleeve 114. The clutch assembly 76 is effective to establish a driving connection between the turbine shaft 56 and the torque transfer member 72 during reverse drive operation. Clutch return springs 182 carried by the sleeve 70 act on the piston 174.

A compound carrier assembly 184 journals short planet pinions 186 and long planet pinions 188. One side of the carrier 184 is journalled on sun gear 82 as shown at 190. The other side is journalled at 192 on intermediate shaft 194 which surrounds the shaft 62. The right-hand end of intermediate shaft 194 is journalled at 196 on the output shaft 16. The other end of the intermediate shaft 194 is supported by bushing 198 on the right-hand end of the turbine shaft 56. Shaft 194 provides also a bearing point for the sun gear shaft 88 as shown at 200.

The right-hand end of the shaft 194 is splined at 202 to the impeller driven shaft 62.

The compound planetary gear unit 12 includes also a ring gear 204 which meshes with long planet pinions 188. Pinions 188 engage also the larger sun gear 82. The pinions 186 and 188 drivably engage each other and the pinions 186 engage also smaller sun gear 90. Pinions 186 are journalled on pinion shafts 206 which form a part of the carrier 184, and pinions 188 are journalled on pinion shafts 208 which also form a part of the carrier 184.

Ring gear 204 is connected drivably to the output shaft 16 through torque transfer member 210 and driveplate 212 connected to the output shaft 16. The intermediate shaft 194 carries annular cylinder 214 and is drivably connected to it. Piston 216 is received in the cylinder 214, and it defines a pressure chamber 218 which is pressurized with fluid through pressure port 220 in the intermediate shaft 194, which in turn communicates with pressure passage structure 222 in brake support 224 and in the end wall 226 of the housing 18.

A brake drum 228 is journalled on the brake support 224 and is surrounded by a multiple wrap brake band 230. Brake band 230 can be applied and released by a fluid pressure operated servo, not shown. Brake drum 228 is connected drivably to the carrier through drive shell 232.

Brake drum 228 carries an overrunning brake outer race 234, and overrunning brake inner race 236 is formed on the brake support 224. Overrunning brake rollers 238 are situated between the races 234 and 236 to provide a one way braking action for the brake drum 228 during low speed-ratio, forward drive operation. Freewheeling is permitted when the direction of the brake reaction torque is reversed. Brake band 230 is applied during operation in the first speed-ratio condition to establish hill braking operation when the torque direction is reversed. It is applied also during reverse drive operation.

Piston 216 is urged to a clutch release position by clutch spring 240 which is anchored on a spring seat 242 carried by the intermediate shaft 194. Multiple disc clutch assembly 244 includes clutch plates drivably connected to the cylinder 214 and cooperating clutch discs drivably connected to clutch member 246, the latter being connected in turn to the carrier 184 as shown at 248. When pressure is applied to the clutch chamber 218, the piston engages the clutch discs of the clutch disc assembly 244 to establish a driving connection between intermediate shaft 194 and the carrier 184.

The clutch disc assembly 244 is engaged during third speed-ratio operation and fourth speed-ratio operation as well as during operation in the third speed-ratio, hill braking condition.

Output shaft 16 is journalled at 250 on the end wall 226 and extends through the brake support member 224. It carries a parking gear 252 and extends rearwardly through a transmission extension housing 254.

In the schematic representation in FIG. 4 I have illustrated the various clutches and brakes for the gear elements by letter symbols so they can be related to the chart of FIG. 3 where the clutch-and-brake engagement and release pattern is illustrated using the letter symbols.

Ratio changes can be achieved during acceleration from a standing start without an overlapping in the engagement and release of the clutches and brakes. A non-synchronous shift can be achieved from the low ratio to the intermediate ratio by engaging brake assembly 164, which anchors the sun gear 82, while the overrunning brake 238 is allowed to overrun. A ratio change to the direct-drive ratio can be achieved by engagement of a single friction member; namely clutch 244, as clutch 78 remains applied. Clutch 78 is applied in each of the four forward driving ratios. Overrunning brake 160 now is permitted to freewheel. A portion of the torque now is distributed mechanically to the driveline and a portion of the torque is distributed directly from the engine driven shaft 14 through the clutch 244 to the carrier of the planetary gear unit. The balance of the torque is distributed hydrokinetically through the converter and through engaged clutch 78 to the sun gear 90.

This improves the overall transmission efficiency since the hydrokinetic losses are reduced because of the reduction of the torque being distributed through the converter. In a similar fashion, brake 146 is applied to effect fourth ratio operation. This causes the overrunning brake 94 to freewheel.

Coast braking can be achieved in each of the four ratios by engaging the friction member that is in parallel disposition with the various overrunning couplings. In summary, brake 164 is applied during second hill braking operation as well as operation in the second, third and fourth forward driving ratios. Brake 146 is applied during second hill braking operation as well as in the fourth forward driving ratio. Clutch 78 is applied during each forward ratio and also during hill braking in the first, second and third ratio. Clutch 122 is applied during operation in the first, second and third hill braking ratios. Clutch 244 is applied during operation in the third hill braking ratio as well as in the third and fourth forward driving ratios. Brake band 230 is applied during first speed ratio hill braking as well as during reverse drive.

During operation in reverse drive the clutch 76 is applied and turbine torque then is distributed through it to the sun gear 82 as the carrier 184 is anchored by the brake band 230. This drives the ring gear 204 in a reverse direction.

Sun gear 82 also acts as a reaction point during overdrive operation since it is anchored by the brake 146. The carrier is connected to the impeller driven shaft 62 through the clutch 244; and with the sun gear 82 acting as a reaction point, the ring gear 204 is overdriven thus establishing a fully mechanical torque delivery path from the engine to the driven shaft.

Second speed ratio operation is achieved by applying brake 164 to anchor the sun gear 82 as the sun gear 90 serves as a torque input element, the clutch 78 acting to deliver turbine to the sun gear as explained previously.

Having described a preferred embodiment of my invention, what I claim and desire to secure by U.S. Letters Patent is:

1. A multiple ratio power transmission mechanism including four forward driving ratios and a single reverse ratio, the fourth overdriving ratio being an overdrive and the third forward driving ratio being a direct drive, compound planetary gearing including a pair of sun gears of differential diameter, a ring gear and a compound planet pinion assembly including a first planet set engageable with the larger sun gear and a second planet set engageable with the smaller sun gear, a ring gear engageable with the first planet set, said planet sets being engageable with each other and being supported on a common carrier, a driven member connected to said ring gear, a hydrokinetic unit including a bladed impeller and a bladed turbine, a driving member connected to said impeller, a forward driving clutch assembly comprising a first selectively engageable friction clutch and an overrunning coupling means arranged in series relationship for connecting said turbine to said smaller sun gear during operation in the first, second and third speed ratios, a first overrunning brake for transferring reaction torque from said carrier to a stationary portion of the mechanism during operation in the low speed ratio, intermediate brake means comprising a second overrunning brake and a friction brake arranged in series relationship for distributing reaction torque from the larger sun gear to said stationary portion during intermediate speed ratio operation, second friction clutch means for connecting said driving member to said carrier during third speed ratio operation and during overdrive operation, said first clutch means distributing torque to the smaller sun gear during direct-drive operation to establish a split torque delivery with a portion of the torque of the driving member being distributed hydrokinetically and the balance being distributed mechanically to the driven member, and an overdrive brake means for anchoring the larger sun gear during overdrive operation as said second overrunning brake freewheels.

2. A multiple ratio power transmission mechanism including four forward driving ratios and a single reverse ratio, the fourth overdriving ratio being an overdrive and the third forward driving ratio being a direct drive, compound planetary gearing including a pair of sun gears of differential diameter, a ring gear and a compound planet pinion assembly including a first planet set engageable with the larger sun gear and a second planet set engageable with the smaller sun gear, a ring gear engageable with the first planet set, said planet sets being engageable with each other and being supported on a common carrier, a driven member connected to said ring gear, a hydrokinetic unit including a bladed impeller and a bladed turbine, a driving member connected to said impeller, a forward driving clutch assembly comprising a first selectively engageable friction clutch and an overrunning coupling means arranged in series relationship for connecting said turbine to said smaller sun gear during operation in the first, second and third speed ratios, a first overrunning brake for transferring reaction torque from said carrier to a stationary portion of the mechanism during operation in the low speed ratio, intermediate brake means comprising a second overrunning brake and a friction brake arranged in series relationship for distributing reaction torque from the larger sun gear to said stationary portion during intermediate speed ratio operation, second friction clutch means for connecting said driving member to said carrier during third speed ratio operation and during overdrive operation, said first clutch means distributing torque to the smaller sun gear during direct-drive operation to establish a split torque delivery with a portion of the torque of the driving member being distributed hydrokinetically and the balance being distributed mechanically to the driven member, an overdrive brake means for anchoring the larger sun gear during overdrive operation as said second overrunning brake freewheels, third clutch means in parallel disposition with respect to said overrunning coupling means and engageable to establish hill braking operation upon a torque reversal during low, intermediate and direct drive operation, reverse brake means in parallel relationship with respect to said first overrunning brake to establish a torque reaction point during reverse drive operation, and a reverse clutch means for connecting said turbine to the larger sun gear during reverse drive operation.

3. The combination as set forth in claim 2 wherein said reverse clutch means comprises a clutch output element in the form of a torque transfer member surrounding said first clutch means and said third clutch means, a common torque output element for said first clutch means and said third clutch means comprising a clutch drum within said output element of said first clutch means, a torque input element of said first clutch means being connected to the clutch output element of said first clutch means and said third clutch means, common servo means for said first clutch means and said third clutch means comprising a cylinder connected to the clutch drum thereof, a compound piston in said cylinder including a first piston portion cooperating with said cylinder to define a first pressure chamber, a second piston portion registering with said first piston portion and cooperating therewith to define a second pressure chamber, said piston portions being independently moveable as pressure is applied to said first pressure chamber and said second pressure chamber selectively, said second piston portion being engageable with and actuating said first clutch means and said first piston portion being engageable with and actuating said third clutch means.

4. The combination as set forth in claim 3 wherein said overdrive ratio brake means comprises friction brake elements carried by the output element of said reverse clutch means, said second overrunning brake means being situated in a location intermediate said reverse clutch means and said hydrokinetic unit and said first clutch means, and said third clutch means being disposed between said reverse clutch means and said compound gearing whereby the clutch and brake structure occupy minimum space to effect a minimum diameter assembly.

* * * * *